(12) United States Patent
Klein et al.

(10) Patent No.: US 7,657,737 B2
(45) Date of Patent: Feb. 2, 2010

(54) METHOD FOR MAPPING AN ENCRYPTED HTTPS NETWORK PACKET TO A SPECIFIC URL NAME AND OTHER DATA WITHOUT DECRYPTION OUTSIDE OF A SECURE WEB SERVER

(75) Inventors: Paul Fredric Klein, Newbury Park, CA (US); Jesse Nicholas Perez, Floral City, FL (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 11/067,990

(22) Filed: Feb. 28, 2005

(65) Prior Publication Data

US 2006/0195687 A1    Aug. 31, 2006

(51) Int. Cl.
*H04L 29/06* (2006.01)
*H04K 1/00* (2006.01)

(52) U.S. Cl. ................. 713/151; 713/153; 380/255
(58) Field of Classification Search ............ 713/151, 713/153; 380/255
See application file for complete search history.

(56) References Cited

U.S. PATENT DOCUMENTS

| | | | |
|---|---|---|---|
| 5,600,722 A * | 2/1997 | Yamaguchi et al. | 713/155 |
| 6,065,046 A * | 5/2000 | Feinberg et al. | 709/216 |
| 6,092,196 A | 7/2000 | Reiche | 713/200 |
| 6,148,336 A * | 11/2000 | Thomas et al. | 709/224 |
| 6,324,648 B1 | 11/2001 | Grantges, Jr. | 713/201 |
| 6,363,477 B1 | 3/2002 | Fletcher et al. | |
| 6,510,464 B1 | 1/2003 | Grantges, Jr. et al. | 709/225 |
| 7,149,892 B2 * | 12/2006 | Freed et al. | 713/151 |
| 7,181,141 B1 * | 2/2007 | Kapur et al. | 398/58 |
| 7,260,623 B2 * | 8/2007 | Wookey et al. | 709/223 |
| 2002/0035559 A1 * | 3/2002 | Crowe et al. | 707/2 |
| 2002/0035681 A1 * | 3/2002 | Maturana et al. | 713/151 |
| 2002/0161667 A1 * | 10/2002 | Felkey et al. | 705/26 |
| 2003/0061387 A1 | 3/2003 | Brown et al. | 709/246 |
| 2003/0065791 A1 | 4/2003 | Garg et al. | 709/229 |
| 2003/0065941 A1 | 4/2003 | Ballard et al. | 713/201 |
| 2003/0074552 A1 | 4/2003 | Olkin et al. | 713/150 |
| 2003/0131259 A1 | 7/2003 | Barton et al. | 713/201 |
| 2003/0135646 A1 | 7/2003 | Inoue et al. | 709/241 |

(Continued)

FOREIGN PATENT DOCUMENTS

WO       WO 98/11702 A       3/1998

(Continued)

OTHER PUBLICATIONS

"Unix Sockets" by Brian Hall, 1997 pp. 1-7. <http://www.ecst.csuchico.edu/~beej/guide/ipc/usock.html>.*

(Continued)

*Primary Examiner*—Michael Pyzocha
(74) *Attorney, Agent, or Firm*—Patterson & Sheridan, LLP

(57) ABSTRACT

A computer-based method of mapping an encrypted network request packet to its decrypted copy in a secure computer network web server. Method creates a plug-in module on a secure web server and saves at least one network address and port number from a captured encrypted network request packet. Plug-in module obtains a decrypted copy of the network request packet from the secure web server decryption module and returns it with the network address and port number.

21 Claims, 2 Drawing Sheets

U.S. PATENT DOCUMENTS

| | | |
|---|---|---|
| 2003/0163608 A1 | 8/2003 | Tiwary et al. |
| 2004/0103277 A1 | 5/2004 | Seada et al. .................. 713/160 |
| 2004/0128538 A1 | 7/2004 | Gmuender et al. ........... 713/201 |
| 2004/0210828 A1* | 10/2004 | Langer .................... 715/501.1 |
| 2004/0230820 A1* | 11/2004 | Hui Hsu et al. .............. 713/200 |
| 2004/0236819 A1 | 11/2004 | Anati et al. ................. 709/200 |

FOREIGN PATENT DOCUMENTS

WO     WO 02/101516 A     12/2002

OTHER PUBLICATIONS

PCT International Patent Search Report and Written Opinion mailed on May 31, 2006.

* cited by examiner

METHOD FOR MAPPING AN ENCRYPTED HTTPS NETWORK PACKET TO A SPECIFIC URL NAME AND OTHER DATA WITHOUT DECRYPTION OUTSIDE OF A SECURE WEB SERVER

BACKGROUND OF THE INVENTION

1. Field of the Invention

This invention relates in general to the field of computer networks, and in particular to a method for highly efficient mapping of encrypted HTTPS network packets to a specific URL name and other encrypted data without performing the decryption outside of a secure web server.

2. Description of Related Art

The Internet is a vast network of heterogeneous computers and subnetworks all communicating together to allow for global exchange of information. The World Wide Web (WWW) is one of the more popular information services on the Internet which uses web browser software to decipher hypertext links to documents and files located on remote computers or content servers to access multimedia information in the form of text, audio, video, graphic, animation, still pictures, etc. It has become increasingly necessary for users to remotely access public and private networks and a problem arises as to how to allow a secure access to the resources available on secure servers and networks over a generally insecure public network such as the Internet.

Many hardware and software utilities and applications, such as network performance monitors, have as their core technology a method of measurement that depends on network data as their input. As more and more e-commerce unfolds over the Internet, the use of secure network transports increases. Encryption by web browsers is the single most used source of sending secure data over the Internet via the secure Hypertext Transfer Protocol (HTTPS). For the HTTPS protocol, a web browser uses a public/private key technology that encrypts the network data so strongly that only a corresponding secure web server can decrypt it. It is virtually impossible for a hardware or software monitor, which has access to these encrypted network flows, to understand anything about their format let alone anything about their content. Because of this limitation of monitoring tools in an HTTPS environment, the value of data for hardware and software monitors of this network can only be realized for environments using HTTP, which is the nonsecure version of HTTPS.

Moreover, if decryption is done outside the secure web server, it requires a special decryption software regulated by government which makes it less attractive to marketing and distribution. It is also less attractive to customers because it requires access to web server security certificates which customers would not allow. It is therefore important to use another technique that is more tolerable to government regulations, the marketplace and to the customers.

Therefore, there is a need for a simple, optimized and generic method that is using secure network servers to decrypt a portion of the network data to enable hardware and software network monitors to get the information they need to operate so that they can return the same data as if operating in the HTTP nonsecure environment, without using a special decryption software outside of a secure network server.

SUMMARY OF THE INVENTION

The foregoing and other objects, features, and advantages of the present invention will be apparent from the following detailed description of the preferred embodiments, which makes reference to several drawing figures.

One preferred embodiment of the present invention is a method of mapping an encrypted network request packet to its decrypted copy in a secure computer network web server. Method creates a plug-in module on a secure web server and saves at least one network address and port number from a captured encrypted network request packet. Plug-in module obtains a decrypted copy of the network request packet from the secure web server decryption module and returns it with the network address and port number.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings, which form the part thereof, and in which are shown, by way of illustration, specific embodiments in which the invention may be practiced. It is to be understood that other embodiments may be utilized and structural and functional changes may be made without departing from the scope of the present invention.

The main goal of the present invention is to enable hardware and software network utilities and applications to operate in a secure environment and have access to the same data as if operating in the Hypertext Transfer Protocol (HTTP) nonsecure environment, and to have the network data decryption done by a secure web server, as part of the web server's normal operation.

The present invention discloses a method of mapping an encrypted network request packet to its decrypted copy in a secure computer network server. Monitor module of the present invention obtains a decrypted copy of the network request packet from the secure web server decryption module.

Encrypted network request is preferably an encrypted Hypertext Markup Language (HTML) request and its encrypted data, such as Universal Resource Locator (URL) name, are needed for accessing a Web site. For getting the encrypted information out of an HTTPS network request packet without having to implement a special decryption technology, the present invention makes use of a web server's ability to have a decrypted HTTPS network packet delivered as part of the web server plug-in. Thus, the present invention does not require the decryption to take place outside of a secure web server. Moreover, it does not require a special decryption software but utilizes data obtained from a conventional decryption software of the secure web server during its normal operation. In this way, the decryption is done by a conventional web server software already approved by the government, already accepted in the marketing and distribution world and already deployed by customers.

The main aspect of the present invention maps a completely encrypted HTML request, as seen by a hardware or software monitoring software, to the completely decrypted HTML request, as seen by a secure web server. This can be accomplished due to the fact that all commercially used secure web servers provide a published technique to obtain a copy of the encrypted HTML request packet and to hand over, after decryption, a copy of the decrypted request packet to a monitor of the present invention which normalizes the data so they look like data gotten from a nonsecure HTTP environment. Type of the published technique required to obtain a decrypted copy of the HTML request packet depends on the vendor's secure web server type which is used by the customer.

Figure 1:
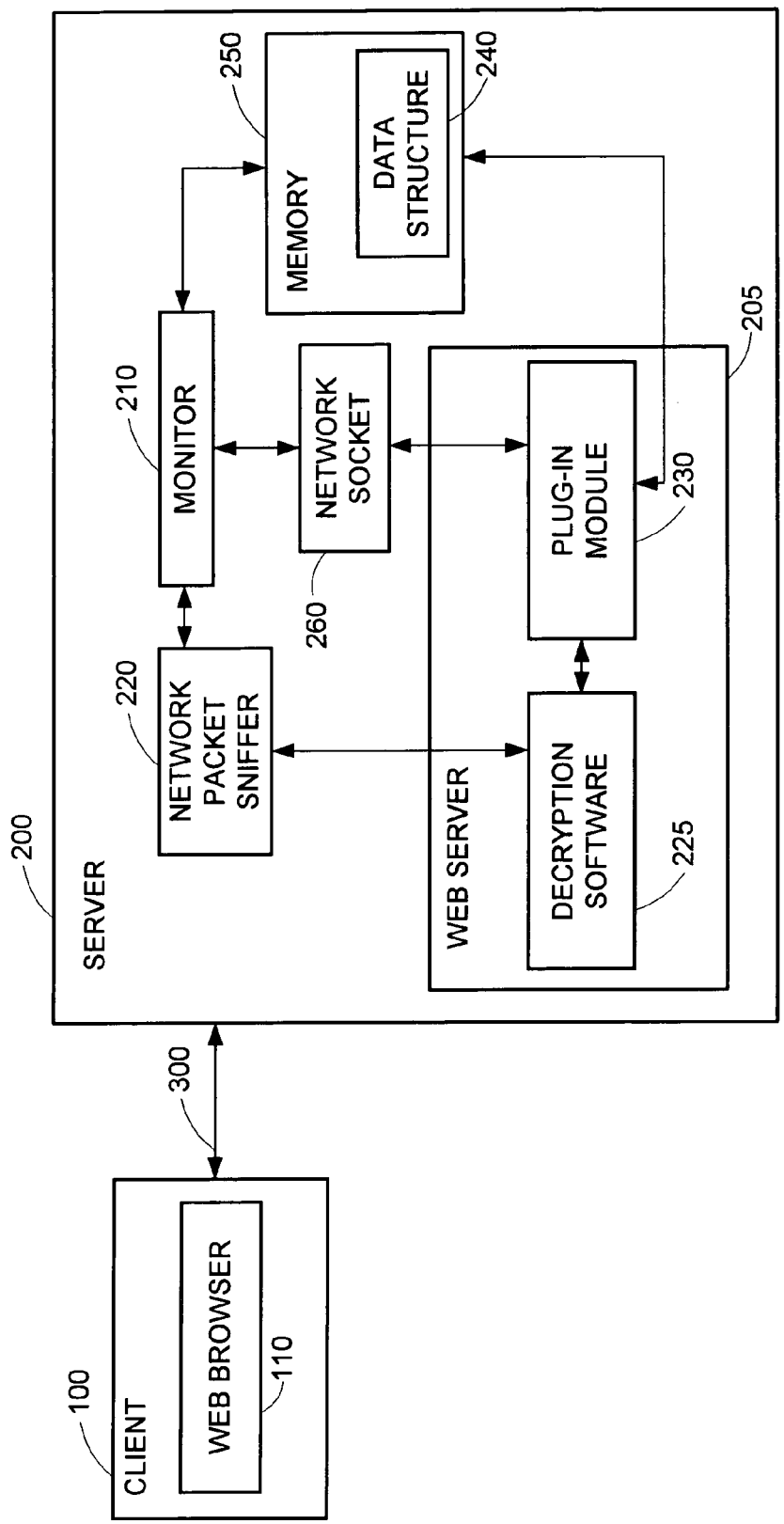
FIG. 1 illustrates a hardware and software network environment enabling efficient mapping, according to the preferred embodiments of the present invention.

FIG. 1 illustrates a hardware and software network environment enabling efficient mapping, according to the preferred embodiments of the present invention. The system uses the algorithm for the mapping shown in the flowchart of FIG. 2. In a block diagram of FIG. 1 a customer at a client site 100 interacts with a server site 200 which is preferably secure, via a network 300. Network 300 is usually the Internet using the Transmission Control Protocol/Internet Protocol (TCP/IP), which is the packet switching protocol over the Internet. Client site 100 may be a desktop or laptop computer, personal digital assistant (PDA), onboard vehicle computer, cellular phone, etc, which sends its request, such as a request for a Web site, either under the Hypertext Transfer Protocol (HTTP) or under the secured Hypertext Transfer Protocol (HTTPS), to an Internet Service Provider (ISP), not shown. ISP establishes a link to the Internet which then passes the request to a content server, not shown, which forwards the request to a content provider, not shown, typically addressed by Uniform Resource Locator (URL) name.

The response from the content server is routed back to the client site 100 and is typically compliant with the Hypertext Markup Language (HTML), that is the standard language for creating documents on the WWW. HTML defines the structure and layout of a web document by using a variety of tag commands inserted in the document to specify how a portion or the whole document should be formatted. A request may be sent to a secure server, which is a content server that supports any of the major security protocols that encrypt and decrypt messages to protect them against third party tampering. A typical such protocol is a Secure Sockets Layer (SSL) protocol that uses encryption with a public and private key and password; other methods use encrypted digital certificates. The socket of an SSL is typically a software object.

The uniqueness of the present invention lies in mapping a random encrypted HTML request, captured by network monitoring hardware or software, to the name of the URL and other encrypted data that provide value to monitoring software. Each HTTPS request has a small, unencrypted header that flows on the network as part of the request and is fitted just in front of the request. This is needed for network devices, such as routers and switches, to route the request to a destination network address. Network devices cannot read encrypted data so this header must remain unencrypted. This header is used to this invention's advantage. When a random encrypted HTML request is captured by the network monitoring software, its origin and destination network addresses and ports are saved in an in-memory data structure for later access to the encrypted request.

Figure 2:
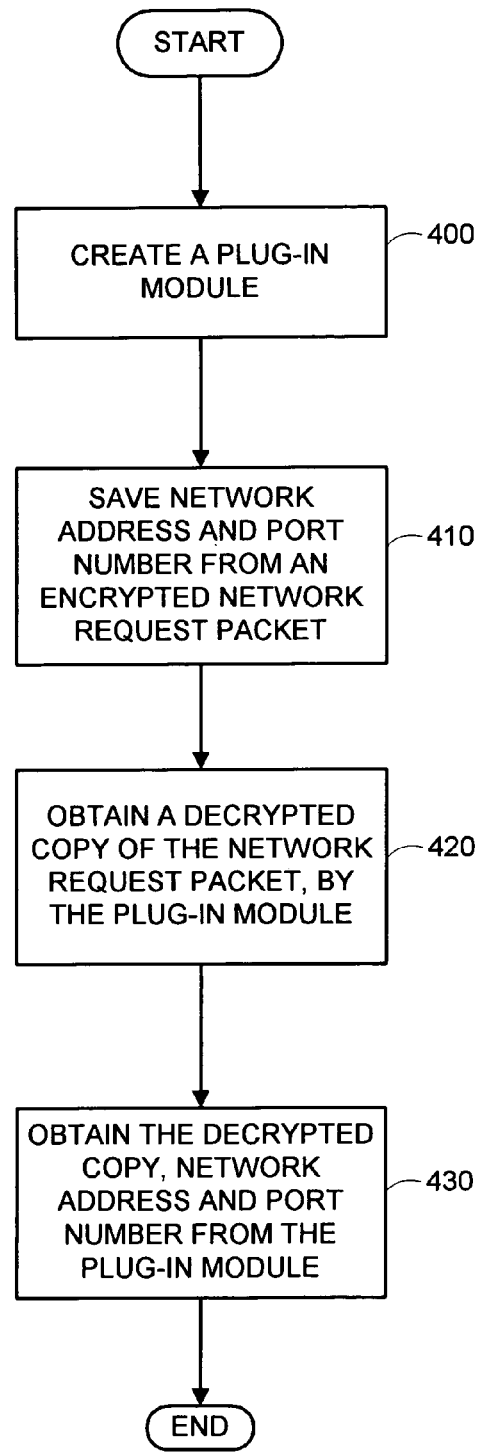
FIG. 2 illustrates a top level flowchart of the mapping, according to the preferred embodiments of the present invention.

Algorithm for an exemplary mapping procedure is illustrated by a flowchart of FIG. 2. In the preferred aspects of the present invention, a user of the client site 100 uses the HTTPS protocol to encrypt its network packets. This renders them unreadable to technologies that watch packets which transverse the network 300, such as Network Packet Sniffers, and only a web server with a corresponding HTTPS protocol can encrypt the received network packets. The user interacts with the server site 200 through a web browser 110, located at the client site 100, which encrypts network packets and puts an HTTPS request on the network 300. The request transverses the network 300 and arrives at the server 200 where a monitoring software named Monitor 210 of the present invention is running. Monitor 210 corresponds with a Network Packet Sniffer 220 that is always running. Thus, the Monitor 210 sees the encrypted content of the network packet but cannot make much sense of it. However, even encrypted network packets have a portion in a header that is not encrypted, such as the network address and port number, which needs to remain unencrypted because it is used by hardware routers that do not have the capability to decrypt. Therefore, the Monitor 210 can successfully read the network address and port number of encrypted network packets but nothing else. However, there is a need for users to be able to read some data that are embedded in the encrypted network packet, such as URL name. Therefore, in step 400 of FIG. 2, Monitor 210 creates and registers a plug-in module 230 with a web server 205 at the time the web server 205 is started.

In order to perform mapping between the URL name and other encrypted data, and the client's network address and port number, in step 410 Monitor 210 saves network address and port number from the encrypted network request packet, originated in the client site 100 and received from the Network Packet Sniffer 220. Monitor 210 then takes a copy of the encrypted network packet and places that encrypted packet into a data structure 240 in a memory 250. Data structure may be a tree related to the specific root URL or a table or queue indexed by the client site's network address and port number.

At the web server 205, the network packet is decrypted by the web server conventional decryption software 225, located inside the web server 205, as part of the web server's normal processing. The plug-in module 230 is typically referred to as a Web Filter, for Microsoft IIS web servers, and an NSAPI, for Apache's and Netscape's web servers. In step 420, the plug-in module 230 obtains the copies of the HTTPS network packets from the decrypted HTML request.

Once the plug-in module 230 gets the decrypted copy of the HTTPS network packets from the web server conventional decryption software 225, important data, such as the URL name, URL referrer and application specific content can be extracted from this copy of the request. However, since only a copy of the HTML request was obtained by the Web Filter or NSAPI, the network specific information is not available and that information is what is needed to make a relationship match to the original encrypted request. Therefore, some Application Program Interfaces (APIs) have to be invoked at the secure web server to get the network address and port numbers associated with this copy of the request. These APIs are different for each secure web server vendor. Thus, the plug-in module 230 makes API calls to web server 205 to get the network address and port number associated with the network packet.

The plug-in module 230 then opens a network communication socket 260 between the plug-in module 230 and the Monitor 210 and, via a pipe, passes the decrypted HTTPS network packet, the network address and port number to the Monitor 210, in step 430. Monitor 210 then performs a merging and normalization. Based on the network address and port number, Monitor 210 first performs the search of the in-memory data structures 240 and tries to find an entry matching the passed decrypted HTTPS network packet, based on its network address and port number.

If such an entry is found, the stored encrypted content of the network packet is replaced by the decrypted content received from the plug-in module 230. If a match cannot be found, the Monitor 210 discards the data received from the plug-in module 230 and continues. If a matching entry exists, a captured encrypted network HTTPS request, which normally cannot be related to a URL name, is now paired with a URL name and other previously encrypted data, which gives the data back to the network monitors that were hidden by the HTTPS protocol. Thus, the Monitor 210 has in the in-memory data structure 240 all the information that it normally would have had if the protocol was the unsecured HTTP, such as a URL name of a target resource which can be an image, program file, HTML page, Java applet, etc.

Therefore, at this point the Monitor 210 can extract the URL name and other data from the stored decrypted network packet and can make use of it for various data managing solutions in network transactions, for banking and other software services, applications and data handling programs, including data mining, pattern recognition, data analysis, transcoding from HTML into wireless application protocol (WAP), data conversion, monitoring performance of Internet HTTP server applications and data transfer over a communications network between a client and server site.

The present invention can be realized in hardware, firmware or software, any combination of hardware, firmware and software, or in any other process capable of providing the disclosed functionality. Implementation of the method of the present invention can be realized in a centralized fashion in one server computer system, or in a distributed fashion where different elements are spread across several interconnected computer systems. Any type of computer system or apparatus adapted for carrying out the methods described herein is suited to perform the functions described herein. FIG. 1 illustrates a general purpose computer system with a group of computer programs which, when being loaded and executed, control the computer system in such a way that it carries out the method aspects of the present invention. The computer programs can be embedded in a computer usable medium which comprises all the features enabling the implementation of the methods described herein and which are able to carry out these methods when loaded in a computer system. In the exemplary environment of FIG. 1, a computer system of the server site 200 is comprised of one or more processors, not shown, which may be connected to one or more electronic storage devices, not shown, such as disk drives.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for mapping an encrypted network request packet to its decrypted copy in a secure web server application, comprising configuring one or more computer processors to perform an operation comprising:
   (a) a network monitor outside of the secure web server application creating, by operation of the one or more computer processors, a plug-in module within the secure web server application in order to obtain the decrypted copy of the network request packet without requiring decryption to occur outside of the secure web server application;
   (b) the network monitor saving at least one network address and port number from a captured encrypted network request packet;
   (c) the plug-in module obtaining the decrypted copy of the network request packet from a decryption module within the secure web server application;
   (d) the network monitor obtaining from the plug-in module the decrypted copy of the network request packet, an associated network address, and an associated port number; and
   (e) the network monitor mapping the decrypted copy of the network request packet to the encrypted network request packet using the respective network addresses and port numbers.

2. The method according to claim 1, wherein the step (d) further comprises the step of saving the network address and port number and the decrypted network packet in a data structure indexed by the network address and port number.

3. The method according to claim 1, wherein the network is Internet, encryption is performed according to the secured Hypertext Transfer Protocol (HTTPS) and the encrypted network request is compliant with the Hypertext Markup Language (HTML).

4. The method according to claim 1, wherein the encrypted network request packet comprises a Universal Resource Locator (URL) name, application specific content, or a hypertext link to a remote target resource which is chosen from the group comprising text, audio, video, graphic, animation, still picture, program file, HTML page and JAVA applet.

5. The method according to claim 1, wherein the decryption is performed by web server conventional decryption software as part of normal processing of the web server application, the plug-in module is chosen from the group comprising Web Filter and NSAPI, and the network address and port number from the captured encrypted network request packet are transferred unencrypted.

6. The method according to claim 1, wherein the step (c) further comprises the step wherein the plug-in module invokes Application Program Interfaces (APIs) of the secure web server application to get the network address and port number of the original encrypted request associated with the decrypted network request packet.

7. The method according to claim 1, wherein the step (d) further comprises the step wherein the plug-in module creates a network socket and transfers the decrypted HTTPS network packet, the network address and port number via a pipe.

8. A computer program product for mapping an encrypted network request packet to its decrypted copy in a secure web server application, the computer program product comprising a computer usable storage medium storing computer usable program code configured to:
   (a) create, by a network monitor outside of the secure web server application, a plug-in module within the secure web server application in order to obtain the decrypted copy of the network request packet without requiring decryption to occur outside of the secure web server application;
   (b) save, by the network monitor, at least one network address and port number from a captured encrypted network request packet;
   (c) obtain, by the plug-in module, the decrypted copy of the network request packet from a decryption module within the secure web server application;
   (d) obtain, by the network monitor and from the plug-in module, the decrypted copy of the network request packet, an associated network address, and an associated port number; and (e) mapping, by the network monitor, the decrypted copy of the network request packet to the encrypted network request packet using the respective network addresses and port numbers.

9. The computer program product according to claim 8, wherein the step (d) further comprises the step to save the network address and port number and the decrypted network packet in a data structure indexed by the network address and port number.

10. The computer program product according to claim 8, wherein the network is Internet, encryption is performed according to the secured Hypertext Transfer Protocol (HTTPS) and the encrypted network request is compliant with the Hypertext Markup Language (HTML).

11. The computer program product according to claim 8, wherein the encrypted network request packet comprises a Universal Resource Locator (URL) name, application specific content, or a hypertext link to a remote target resource which is chosen from the group comprising text, audio, video, graphic, animation, still picture, program file, HTML page and JAVA applet.

12. The computer program product according to claim 8, wherein the decryption is performed by web server conventional decryption software as part of normal processing of the web server application, the plug-in module is chosen from the group comprising Web Filter and NSAPI, and the network address and port number from the captured encrypted network request packet are transferred unencrypted.

13. The computer program product according to claim 8, wherein the step (c) further comprises the step wherein the plug-in module invokes Application Program Interfaces (APIs) of the secure web server application to get the network address and port number of the original encrypted request associated with the decrypted network request packet.

14. The computer program product according to claim 8, wherein the step (d) further comprises the step wherein the plug-in module creates a network socket and transfers the decrypted HTTPS network packet, the network address and port number via a pipe.

15. A system, comprising:
a processor; and
a memory containing a packet mapping program, which when executed by the processor is configured to perform an operation for mapping an encrypted network request packet to its decrypted copy in a secure web server application, comprising:
(a) a network monitor outside of the secure web server application creating a plug-in module within the secure web server application in order to obtain the decrypted copy of the network request packet without requiring decryption to occur outside of the secure web server application;
(b) the network monitor saving at least one network address and port number from a captured encrypted network request packet;
(c) the plug-in module obtaining the decrypted copy of the network request packet from a decryption module within the secure web server application;
(d) the network monitor obtaining from the plug-in module the decrypted copy of the network request packet, an associated network address, and an associated port number; and
(e) the network monitor mapping the decrypted copy of the network request packet to the encrypted network request packet using the respective network addresses and port numbers.

16. The system according to claim 15, wherein step (d) further comprises the step of saving the network address and port number and the decrypted network packet in a data structure indexed by the network address and port number.

17. The system according to claim 15, wherein the network is Internet, encryption is performed according to the secured Hypertext Transfer Protocol (HTTPS) and the encrypted network request is compliant with the Hypertext Markup Language (HTML).

18. The system according to claim 15, wherein the encrypted network request packet comprises a Universal Resource Locator (URL) name, application specific content, or a hypertext link to a remote target resource which is chosen from the group comprising text, audio, video, graphic, animation, still picture, program file, HTML page and JAVA applet.

19. The system according to claim 15, wherein the decryption is performed by web server conventional decryption software as part of normal processing of the web server application, the plug-in module is chosen from the group comprising Web Filter and NSAPI, and the network address and port number from the captured encrypted network request packet are transferred unencrypted.

20. The system according to claim 15, wherein the step (c) further comprises the step wherein the plug-in module invokes Application Program Interfaces (APIs) of the secure web server application to get the network address and port number of the original encrypted request associated with the decrypted network request packet.

21. The system according to claim 15, wherein the step (d) further comprises the step wherein the plug-in module creates a network socket and transfers the decrypted HTTPS network packet, the network address and port number via a pipe.

* * * * *

UNITED STATES PATENT AND TRADEMARK OFFICE
CERTIFICATE OF CORRECTION

PATENT NO. : 7,657,737 B2
APPLICATION NO. : 11/067990
DATED : February 2, 2010
INVENTOR(S) : Klein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1175 days.

Signed and Sealed this

Thirtieth Day of November, 2010

David J. Kappos
*Director of the United States Patent and Trademark Office*